Figure 28:
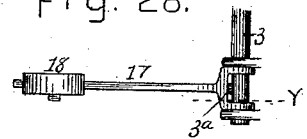

(No Model.) 3 Sheets—Sheet 1.
L. P. GRAHAM.
CORN PLANTER.
No. 474,448. Patented May 10, 1892.
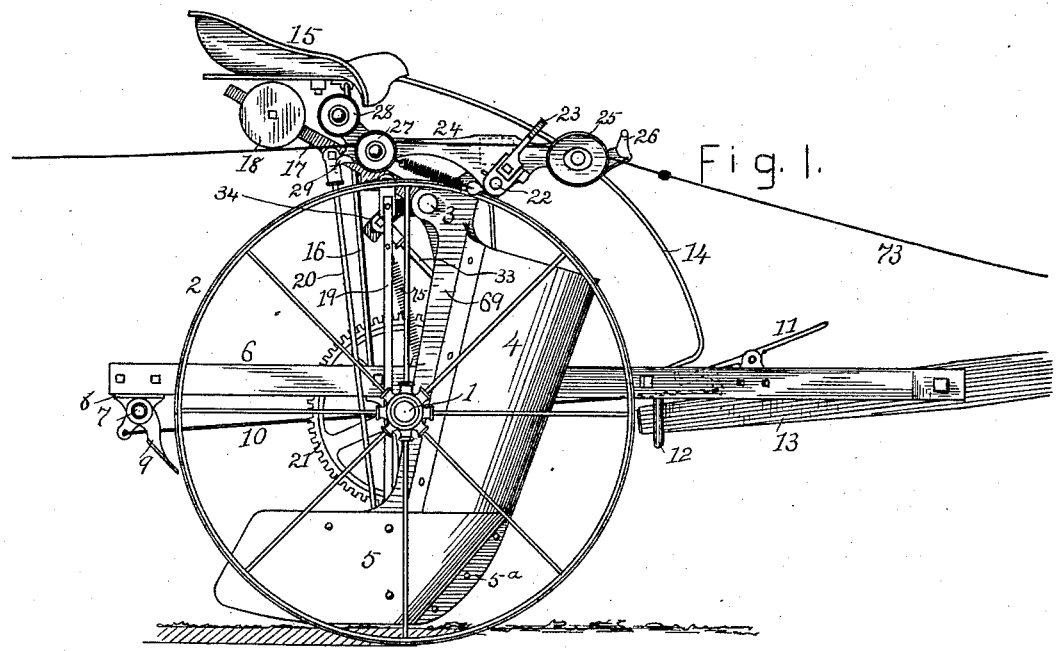
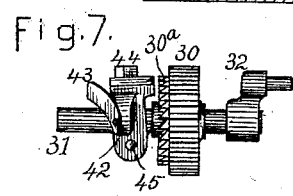
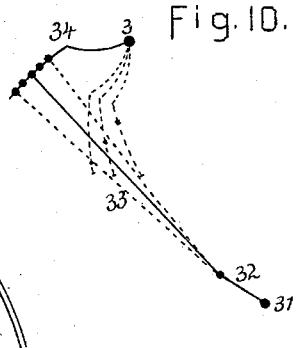
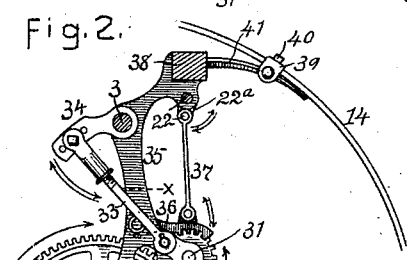
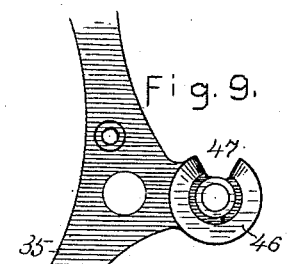
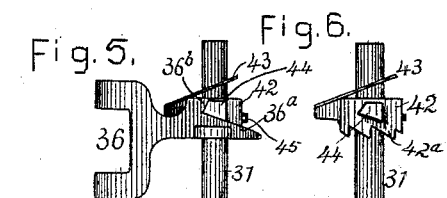
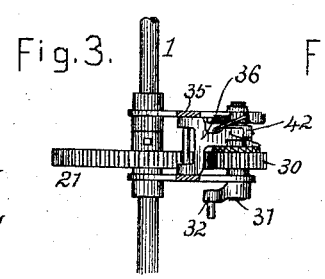
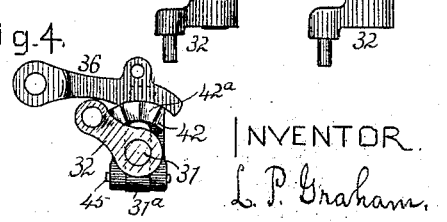
ATTEST.
Helen Graham
W. W. Graham
INVENTOR.
L. P. Graham.

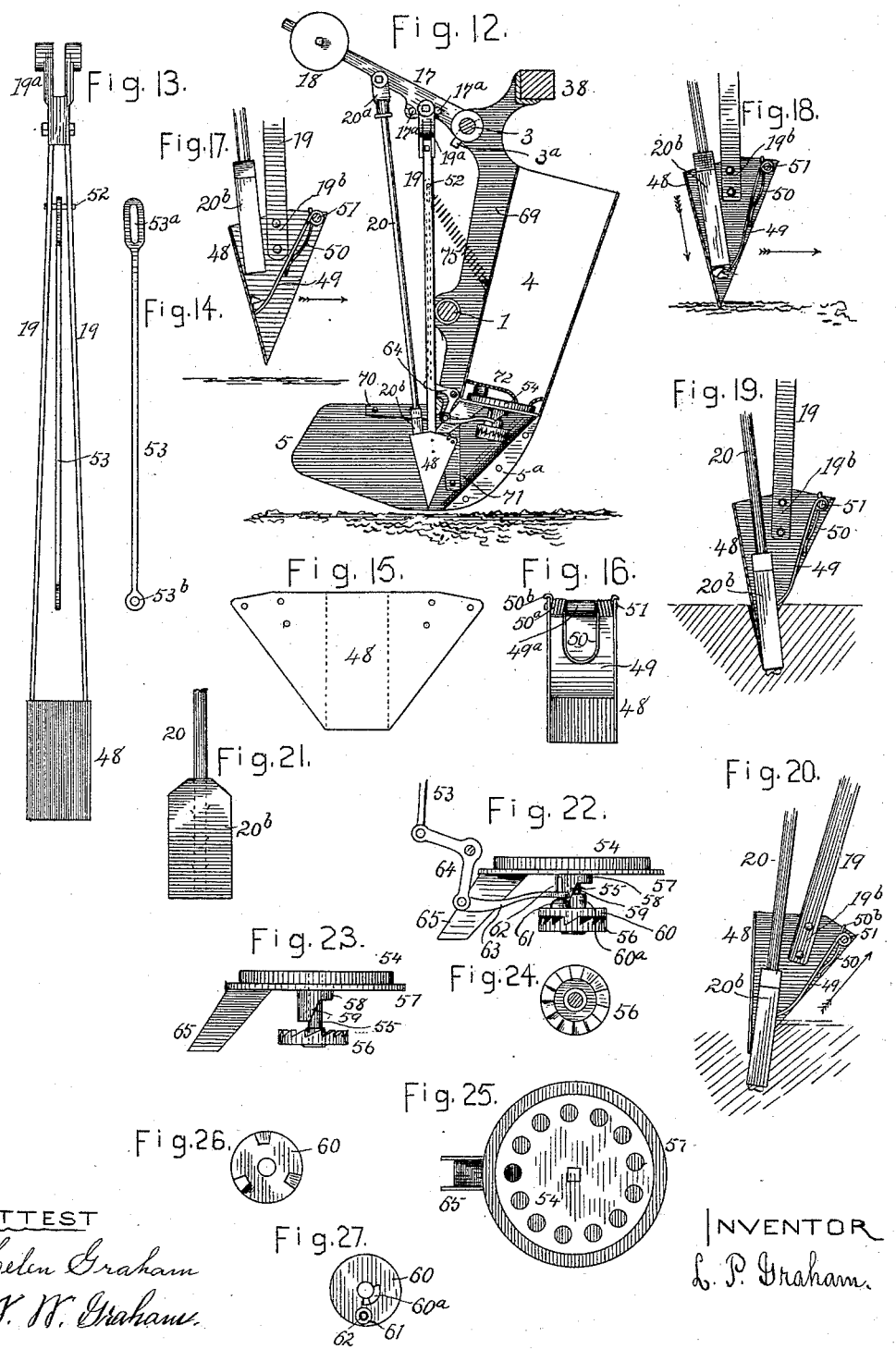

(No Model.) 3 Sheets—Sheet 3.

L. P. GRAHAM.
CORN PLANTER.

No. 474,448. Patented May 10, 1892.

ATTEST
Helen Graham
W. W. Graham

INVENTOR
L. P. Graham

UNITED STATES PATENT OFFICE.

LEVI P. GRAHAM, OF DECATUR, ILLINOIS.

CORN-PLANTER.

SPECIFICATION forming part of Letters Patent No. 474,448, dated May 10, 1892.

Application filed December 1, 1890. Serial No. 373,218. (No model.)

*To all whom it may concern:*

Be it known that I, LEVI P. GRAHAM, of Decatur, in the county of Macon and State of Illinois, have invented certain new and useful Improvements in Corn-Planters, of which the following is a specification.

This invention is in the nature of an improvement on the invention set forth in the application filed by me on the 9th day of May, 1890, for Letters Patent for a corn-planter, the serial number of such application being 351,146.

It consists, first, in a general construction and arrangement of clutch-gearing and planting-prods, whereby the clutch is thrown in mesh by the falling prods in act of planting, instead of by stops on the check-row line, as in my former application; second, in details of construction of the clutch, whereby the same is simplified and the operation made more accurate; third, in arrangement of clutch mechanism with relation to the check-row shaft and planting-prods, whereby the prods are permitted to fall when the shaft is rocked in one direction, and a clutch-separating incline and stop are thrown in the path of the shiftable clutch-member by the return motion of the shaft; fourth, in the relation of the prod-carrying rock-arms to the rock-shaft, whereby the shaft acts forcibly to raise the prods and permissively to let them fall, and whereby the prods on the respective arms may either descend to a greater or less distance independent of the other; fifth, in the construction of the arms and the connections of the prods and plungers therewith, whereby the downward throw of the prods may be varied with relation to the throw of the plungers without varying the extent of their upward throw; sixth, in the adjustable connection between the clutch-crank and the rock-shaft, whereby the downward throw of the rock-arms and consequently the depth of planting may be varied without increasing or diminishing the extent of their upward throw; seventh, in the construction of the grain-measuring or first-drop mechanism, whereby the grain is discharged from the plates as the prods are raised and the plates are effectively locked at the completion of each partial rotation; eighth, in the construction of the prod-buckets, whereby light strong buckets with penetrative points are produced; ninth, in the construction of the prod-valves with relation to the buckets, whereby the valves may open above ground without losing the corn, thus lessening resistance, and whereby the valves are secured in the buckets and held yieldingly in a simple and effective manner; tenth, in the simplified means used to connect the prod-buckets with the rock-arms; eleventh, in the simplified form of plunger and plunger-rod, and, twelfth, in the construction of the planter-frame, whereby strength, lightness, and durability are attained and the hoppers are enabled to rest and rock around the axle without cramping the same.

The invention is expressed by the combinations, sub-combinations, details of construction, and relative arrangements of parts hereinafter set forth and claimed.

Figure 29:
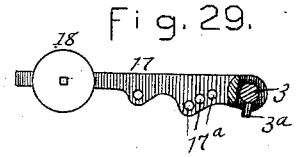
Figure 31:
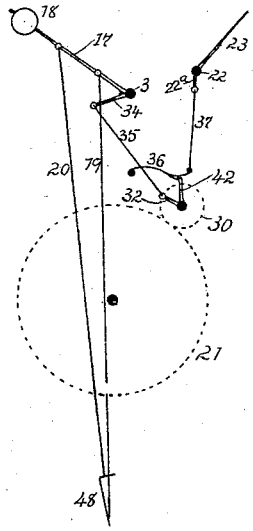
Figure 30:
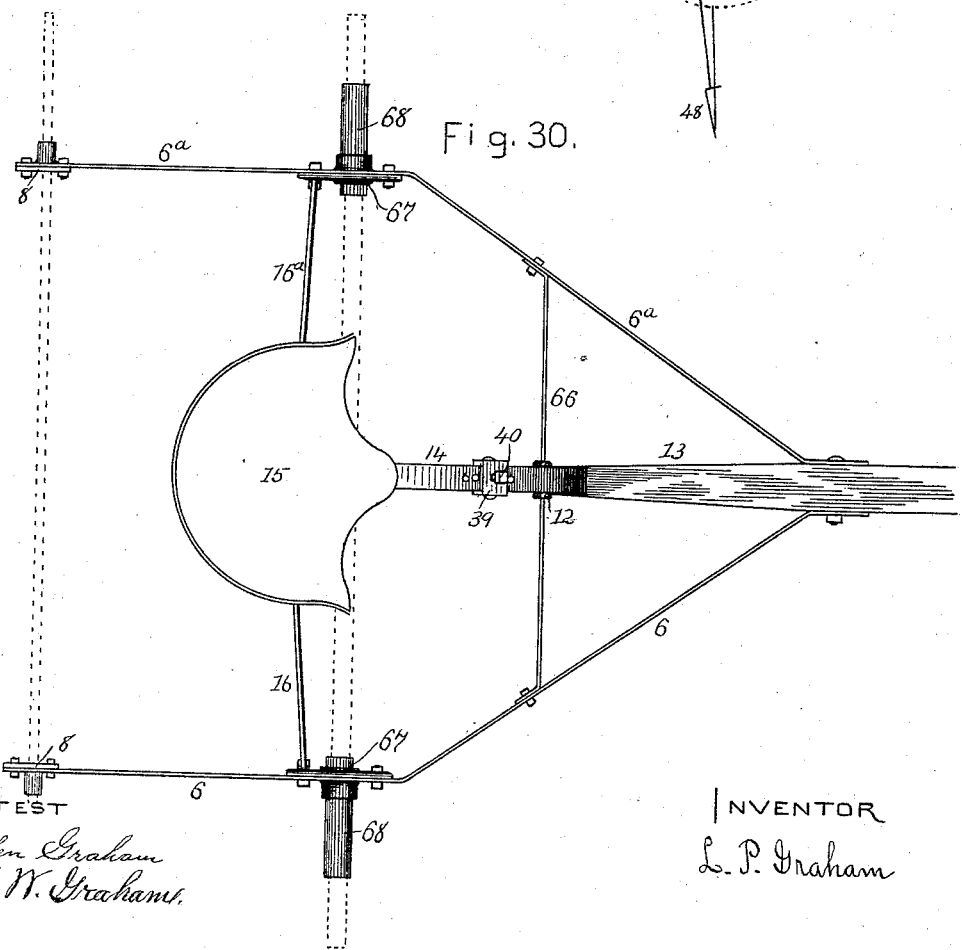

In the drawings accompanying and forming a part of this specification, Figure 1 is a side view of a planter constructed in accordance with my invention. Fig. 2 is a side view of gearing with shafts in section. Fig. 3 is a plan of the clutch, taken on section-line $x$ in Fig. 2. Fig. 4 is a side view of the shiftable member of the clutch, the crank, and the detent. Fig. 5 is a plan of the mechanism shown in Fig. 4. Fig. 6 is a plan of the shiftable clutch member and the crank-shaft. Fig. 7 is a representation of the clutch-pinion, the shiftable clutch member, and the crank-shaft. Fig. 8 is a representation of the crank-shaft. Fig. 9 shows a bracket which guides the shiftable clutch member in mesh with the clutch-pinion and holds it there with more or less firmness during a partial rotation of the crank-arm. Fig. 10 is a diagram showing how the rod connecting the crank-arm with the rock-shaft may be adjusted to permit the prods to descend more or less deeply into the ground without varying the extent of their upward motion. Fig. 11 is an end view of the crank-shaft, showing the shiftable clutch member thereon. Fig. 12 is a section through a seed-hopper, showing the planting mechanism in detail. Fig. 13 is a rear view of a planting-prod. Fig. 14 is a representation of the link that connects the prod with the corn-measuring mechanism. Fig. 15 represents the form of the sheet-metal blank out of which the prod-bucket is constructed. Fig. 16 is a front view of a prod-bucket, showing the arrangement of the valve and valve-spring therein. Fig. 17 is a section through a prod-bucket, showing the position of the plunger therein when the prod is sustained above the ground. Fig. 18 is a similar view showing the positions of the valve, the corn, and the plunger with relation to the bucket during the descent of the prods. Fig. 19 shows the relation of the valve to the surface of the ground when the plunger is at its greatest depth. Fig. 20 shows how the plunger rocks over and is withdrawn diagonally from the ground. Fig. 21 is a representation of the plunger, showing how the rod is secured therein. Fig. 22 is a side view of the corn-measuring mechanism apart from the seed-hopper. Fig. 23 is a side view of the lower plate with discharge-chute and stop-block, and the seed-measuring disk with shaft and actuating ratchet-wheel. Fig. 24 is a plan of the ratchet-wheel, which is fixed on the shaft of the measuring-disk. Fig. 25 is a plan of the measuring-disk, bottom plate, and discharge-chute. Fig. 26 is a view of the top of the oscillating wheel or pawl that is moved from a rock-arm and that moves the measuring-disk. Fig. 27 is a top view of the same disk-actuating wheel, showing the stop thereon. Fig. 28 is a plan of a prod-carrying arm. Fig. 29 is a side view of the prod-carrying arm on section-line Y in Fig. 28. Fig. 30 is a plan of the draft-frame of the planter. Fig. 31 is a diagram illustrative of the movement of the planter.

The shaft 1 acts as an axle for wheels 2, one of which is fixed on the axle to drive the gearing, and the other of which is loose for convenience in turning. The rock-shaft 3 has bearings in the brackets 69, and the sheet-metal seed-hoppers 4 are secured to the same brackets. The sheet-metal plates 5, between a pair of which each prod swings, are secured to extensions 70 and 71 of brackets 69, and the front edges of each pair are secured together to form the sharp fenders 5$^a$.

The draft-frame is formed of two side bars 6 and 6$^a$, and a transverse bar 66, as seen in Fig. 30, and such bars are preferably of steel. The side bars are connected at their forward ends with tongue 13. They diverge rearwardly nearly to the main shaft 1, and from thence run back parallel, or nearly so, to their terminations in the rear of the wheels. The cross-bar 66 connects the side bars about midway between the axle and their front ends. It is connected at its center by link 12 with the rear end of the tongue, and it supports bar 14, which extends upward and rearward and carries seat 15. Secured to each side bar is a bracket 67, and in each bracket is a sleeve 68, which fits around the main shaft and provides a bearing for a seed-hopper bracket 69. The seat is braced and given further support by rods 16 16$^a$, one of which may be a continuation of the other, and which are secured to the brackets 67 or otherwise connected with the frame. At the rear terminations of the side bars are cast brackets 8, which provide bearings for the scraper-shaft 7.

The scrapers 9 are preferably operated by means of a rocking foot-rest 11, which is secured to the forward part of the frame, as seen in Fig. 1, and which connects by a rod 10 with an arm on the scraper-shaft. On each end of the rock-shaft and between lugs of brackets 69, is loosely mounted an arm 17, which may have a weight 18 or the hereinafter-described equivalent thereof. At some distance from the rock-shaft—say two inches—a prod 19 is suspended from the arm, and at a greater distance—say six inches—is suspended a plunger 20. The prod consists of the link 19$^a$, pivotally connected with and preferably embracing the arm, the straps 19 19, connected with the link, the sheet-metal bucket 48, connected with the straps, the valve 49, having a central portion 49$^a$ bent around pivot-pin 51, and the spring-loop 50, coiled around the pin at 50$^a$ and caught over the sides of the bucket at 50$^b$. The plunger consists of a link 20$^a$, pivotally connected with the arm 17, a rod 20, secured to the link, and a block 20$^b$, which is preferably cast onto the end of the rod. The arm 17 has a set of holes 17$^a$, as seen in Fig. 29, which, when the arm is raised to its greatest height, fall in a circle drawn with the prod-bucket as a center, and consequently the prod may be connected in either hole without increasing or decreasing the extent of the rise of the bucket, or, which is the same thing, altering the relation of the bucket to the chute of the corn-measuring or first drop device. Under each arm 17 the rock-shaft is provided with a pin 3$^a$ or other rigid projection, which has the effect to raise the arms when the rock-shaft is thrown in one direction and simply permits them to fall when the rock-shaft moves in the opposite direction. Between the rock-arms about midway are a pair of brackets or castings 35, as seen in Figs. 2, 3, and 9. These brackets have bearings on the axle, connect with the check-row bar 3, and provide bearings for the rock-shaft, the check-row shaft 22, the crank-shaft 31, and the detent 36. Gear-wheel 21 is fixed on the main shaft. Pinion 30 runs loosely on the crank-shaft and meshes with the gear-wheel. The shaft 31 is for the sake of compactness provided with a lateral projection 31$^a$. The shiftable clutch member 42 has a pivot-pin 45, which extends through a hole in the shaft-projection and it swings on such pin to and from the ratchet-face of pinion 30. It has ratchet-teeth (one or more) adapted to the teeth of the pinion, is provided with a stud, as 44, and has a preferably elastic incline 43 on the surface opposite the pinion. The bracket 35 next the shiftable clutch member has an inwardly-projecting cam or guide surface 46, (see Fig. 9,) which is interrupted for a short distance at 47. The rock-shaft has an arm 34, and a rod 33 connects the arm with the crank 32 of shaft 31. The arm 34 has a set of holes arranged in an arc of a circle drawn when the arm is at its greatest height with the swinging end of the crank-arm for a center. The detent 36 has an inclined surface 36ª, (seen in Fig. 5,) which acts on stud 44 to guide the shiftable clutch member from contact with the pinion, and also has the stop notch or projection 36ᵇ, which arrests the motion of the shiftable clutch member and holds the prods in a raised position. There is a connecting-rod 37 extending from the detent to an arm 22ª on the check-row shaft, and such is the interrelation of the arm, detent, and connecting-rod that when the check-row shaft is at rest the different centers are in line, or nearly so, and the detent is held immovably depressed. The check-row bar 38 extends across the planter, is secured to the seed-hopper brackets 69, and has at each end a guide-head 24. Each guide-head is provided with the customary line-receiving pulley 25 and finger 26, and the discharging-pulleys 27 and 28, and each has a novel feature in a horn or finger 29, which projects from the head in the rear of pulley 27 in a position to not interfere with the wire while the planter is traversing the field and to raise the wire clear of the discharge-pulleys when the seed-hoppers, &c., are laid forward at the ends of the field preparatory to turning around.

The check-row shaft has the usual forked levers 23, one at each end, such levers being actuated by the knotted check-row line 73 in the customary manner, and the check-row shaft and arms receiving the usual retractive motion by a spring, as 74, or otherwise.

The seed-boxes, rock-shaft, check-row bar, &c., tend to swing on sleeves 68, but are usually restrained by a catch or stop 41 on seat-bar 14. (See Fig. 2.) This stop has a bearing 39 which is adjustable by means of bolt 40 on bar 14. By means of its adjustment the vertical relation of the check-row levers to the prod-points may be varied to compensate for different speeds in the pace of teams. The stop holds its shown position while the planter is in operation, and is released to permit the prods, buckets, and guards 5, to be swung away from the ground and the check-row line to be detached preparatory to turning around.

The prod-straps have a pin 52, as seen in Fig. 13, which provides a point of connection for spring 75 and for rod or link 53, which has a slot 53ª adapted to such pin. The lower end of rod 53 connects with bell-crank lever 64, and the lever connects through rod 63 with the pawl-wheel 60. The pawl-wheel has the boss 61, on which an end of rod 63 rests, and a pin 62 which the rod engages. It loosely encircles the shaft 55 of the seed-measuring disk 54, and rests normally in mesh with the teeth of ratchet-wheel 56. The ratchet-wheel and the seed-disk are fixed, so far at least as rotation is concerned, on shaft 55, and the wheel has as many teeth as the disk has cells. The plate 57 on which the seed-disk rotates, and which has the discharge-chute 65, is provided with a downwardly-extending boss 58, which forms a bearing for shaft 55 and has the oblique stop-surface 59. The pawl-wheel has a raised portion 60ª which is beveled to conform to the obliquity of the surface of the boss, and such oblique surfaces come in contact and terminate each throw of the pawl-wheel and seed-disk. The top plate and cut-off 72 is of any well-known construction.

In operation, as the planter is moved across the field a forked lever 23 encounters a knot on the check-row line and is swung backward, rocking the check-row shaft and raising the detent. The crank-arm which has been somewhat past a dead-center is given a partial rotation by the falling prods, and simultaneously the detent reassumes its shown position and locked condition. The prods enter the ground to the extent of the throw of the arms, or as far as their weight, inherent or imposed, will carry them. The spring incline of the shiftable clutch-member yields, if necessary, to avoid retarding the downward impulse of the prods and promptly throws the clutch in gear. The crank-shaft is rotated and the prods raised until the incline of the detent and the dead-center of the crank-arm are reached when the shiftable clutch member will be drawn from contact with the pinion, and the stud will strike against the stop-notch of the detent and arrest the action of the planter until another knot is encountered. Prior to the descent of the prods each bucket has been supplied with a "hill" of corn—i. e., enough corn to plant a hill—from the corn-measuring disks of the hoppers. The plungers descend much more rapidly than the buckets and open the valves as the bucket-points are approaching the ground leaving the rear walls of the buckets to carry the grain forward until it is embedded in the ground by the action of the plungers. The prods swing backward, relatively, to accommodate the forward motion of the planter. As they rise, they are drawn toward the hoppers by springs 75. The side plates 5 protect them during their swing, and the buckets are brought to rest under the chutes of the corn-measuring mechanism. As the prods fall, the bell-crank levers rock and force the pawl-wheels backward around the ratchet-wheel something more than the space of a tooth, and as they rise the pawl-wheel, ratchet-wheel, and seed-disk are drawn forward until a filled cell of the seed-disk is brought over the discharge-chute and until the two oblique bearings are in contact, at which time the rotation of the pawl will be arrested by the obstacle in its path, and the rotation of the ratchet-wheel and disk will be stopped by the downward pressure developed by the inclined planes and imparted to the ratchet-teeth through the pawl-wheel. The prod-buckets are drawn under the chutes at or before the time that the corn has started from the disks, and they have time to receive the corn before the next stop on the check-row line is reached. The buckets have their side walls pointed, with the result that the back wall is well braced. No corners exist to be bent in the way of the valve, and the ground is more easily penetrated. The back walls extend obliquely upward and away from the plungers, so that their lower edges act on the plungers as cleaning-scrapers. The valves close against the back walls some distance above the lower ends thereof, and they open above the ground, as indicated in Fig. 19, thus dispensing with considerable amount of force that would otherwise be required to open the valves in the ground. As the arms carrying the prods descend independent of each other and of the rock-shaft, if either strikes a more or less impenetrable obstacle and stops before reaching the required depth the other will complete its throw and actuate the clutch.

The depth of planting is gaged by the wheels and is regulated by the arm 34 and rod 33. If it is desired to plant deep, the rod is connected with the arm at a point near the shaft, and if it is desired to plant shallow the connection is made at the end of the arm. In either case the prod-buckets will rise to the same height, as will be apparent from an inspection of Fig. 10, and will swing properly under the chutes of the hoppers.

Where the ground is comparatively unyielding, as in sod, and the prod-buckets are consequently raised some distance from the ground, it is desirable to extend the throw of the prods, in order that the buckets may carry the corn to the ground; and where the ground is soft the throw may be lessened, in order that the buckets may not penetrate the ground to a needless extent. These results may be attained the one by connecting the prods with the rock-arms near to the plungers and the other by connecting the prods with the arms nearer to the rock-shafts, and such adjustment does not affect the depth of planting nor the relation of the buckets to the plungers and to the hopper-chutes when the arms are raised.

The frame of the planter is light, strong, and durable, and the sleeves prevent the hopper-brackets from cramping the axle.

The check-row line has no work but to raise the detent, and there is consequently but little strain and side draft. The prods fall promptly on being released, thus increasing the accuracy of check-rows, and the clutch is thrown in gear by the prods neither too late nor too soon.

The weights 18 may be used to increase the force of the throw of the prods, or springs 75 may be enlarged and strengthened to effect the same result.

By means of the peculiar intermediate relation of the prods to the check-row line and the clutch the prods fall by gravity or by uniform spring-pressure the instant they are released. Their time of release is always the same with reference to the knots of the check-row line, and their descent is uniformly rapid. They do not depend on the accuracy of construction or chance of accurate coincidence of clutch members, as would be the case if the clutch were thrown in mesh by the check-row line, nor do they depend on or submit to the positive downward throw of the clutch mechanism, as they would if the clutch were thrown in mesh as an initial step in the prodding operation. They (the prods) simply fall into the ground when released. They penetrate to a greater or less depth, according to the condition of the ground and the weight they carry, and one may fall farther to reach a depression while the other comes sooner to rest on account of encountering an elevation, both in the meantime depositing the seed at the same depth. It is essential that the prods should descend instantaneously and with uniform speed when released by the check-row knots, in order to produce accurate check-rows; but it is not necessary that they should be raised uniformly in the same time, as they have a period of rest between each operation, which may be to some extent curtailed; so I permit them to descend to the ground without any interference, and throw the clutch in mesh after the positions of the hills have been established and when a slight variation is unimportant.

I claim—

1. In check-row prod-planters, the combination of planting-prods held normally above the ground, a check-row line adapted to release the prods, and a prod-raising clutch adapted to be thrown in gear by the falling prods, as set forth.

2. The combination of the crank-shaft, the continuously-revolving clutch-pinion mounted loosely on the crank-shaft, the shiftable clutch member secured to the crank-shaft, the inclined surface to throw the shiftable clutch member in gear with the clutch-pinion, and the stop-pawl having the clutch-disengaging incline, whereby the crank-shaft is permitted to revolve when the pawl is raised and the clutch is disengaged and the motion of the crank-shaft is arrested when the pawl resumes its normal position.

3. The combination of the crank-shaft, the continuously-revolving clutch-pinion mounted loosely on the crank-shaft, the shiftable clutch member secured to the crank-shaft, the yielding incline that throws the shiftable clutch member in gear with the clutch-pinion without materially interfering with the motion of the crank-shaft, and the stop-pawl having the clutch-disengaging incline.

4. The combination, with the shiftable clutch member and the disengaging stop-pawl therefor, of the rock-arm $22^a$ and the rod 37, connecting the pawl with the rock-arm, the pivot of the arm and the points of connection of the rod lying normally in line and locking the pawl.

5. The combination, with a rock-shaft, of prod-carrying arms mounted loosely thereon, and studs or projections extending from the shaft below the arms, whereby the shaft acts forcibly to raise the arms and permissively to let them fall.

6. The combination of the crank-shaft, the prod-carrying rock-shaft, the arm 34, secured to the rock-shaft, and the rod 33, connecting the crank with the arm 34, and having adjustment on the arm in a circle drawn when the prods are raised with the swinging end of the crank as a center.

7. The combination of a rock-arm, a plunger suspended from the arm at some distance from the pivot thereof, and a prod-bucket suspended from the arm between the pivot thereof and the connection of the plunger and having adjustment on the arm in a circle drawn when the arm is raised with the prod-bucket for a center.

8. The combination of a seed-measuring disk, a shaft extended downward therefrom, a ratchet-wheel on the lower end of the shaft, a pawl-wheel mounted loosely on the shaft between the ratchet-wheel and the disk, and an inclined stop adapted to arrest the motion of the pawl-wheel and press the same in close contact with the ratchet-wheel.

9. The combination of plate 57, boss 58 on the under surface of plate 57, inclined surface 59 in boss 58, seed-measuring disk 54, resting on plate 57, shaft 55, extending through the boss and connecting at its upper end with the disk and at its lower end with the ratchet-wheel 56, and pawl-wheel 60, loosely encircling the shaft and having stop elevation 60ª, adapted to the incline of boss 58, as set forth.

10. The combination, with a rock-arm carrying a planting-prod and a hopper having seed-measuring mechanism, of a bell-crank lever connected with the seed-measuring mechanism and a strap or rod connecting the bell-crank lever with the rock-arm, as set forth.

11. A planting-prod consisting in the combination of link 19ª, bucket 48, and straps 19 19, connected with the link and with the sides of the bucket, as set forth.

12. The combination of the bucket 48, comprising the side and rear walls, and the valve 49, closing against the rear wall some distance above the lower end thereof, as set forth.

13. The combination of bucket 48, comprising the rear wall and the side walls having inverted apexes at the lower termination of the rear wall and the valve 49, closing against rear wall some distance above the lower end thereof, as set forth.

14. The combination of the sheet-metal bucket, the straps connected with the sides thereof, the pin extended through the sides of the bucket, the valve pivoted on the pin, and the spring-loop extended around the pin, caught over the sides of the bucket, and bearing against the valve.

15. The frame consisting in the combination of bars 6 6ª, brackets 67, and sleeves 68, as set forth.

16. The frame consisting in the combination of side bars 6 6ª, brackets 67, sleeves 68, cross-bar 66, seat-bar 14, rising from the cross-bar, and braces 16 16ª, connecting with bar 14 and with brackets 67, as set forth.

17. The combination, with a rock-arm, of a prod-bucket, a plunger, and a weight, all connected with the arm, the prod-bucket nearest the pivot and the weight nearest the swinging end, as set forth.

In testimony whereof I sign my name in the presence of two subscribing witnesses.

LEVI P. GRAHAM.

Attest:
I. D. WALKER,
C. H. WALTERS.